US011080657B2

(12) United States Patent
Leamon et al.

(10) Patent No.: US 11,080,657 B2
(45) Date of Patent: Aug. 3, 2021

(54) SYSTEMS AND METHODS FOR GENERATING CAMPAIGN ANALYTICS

(71) Applicant: ServiceNow, Inc., Santa Clara, CA (US)

(72) Inventors: Corey Daniel Leamon, Escondido, CA (US); Lucinda Kathryn Foss, San Francisco, CA (US); Robert Robles Wallace, Carlsbad, CA (US); Cresta Kirkwood, San Diego, CA (US); Thomas Gerald O'Neill, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 147 days.

(21) Appl. No.: 16/164,931

(22) Filed: Oct. 19, 2018

(65) Prior Publication Data
US 2020/0090131 A1 Mar. 19, 2020

Related U.S. Application Data

(60) Provisional application No. 62/732,410, filed on Sep. 17, 2018.

(51) Int. Cl.
*G06F 15/16* (2006.01)
*G06Q 10/10* (2012.01)
(Continued)

(52) U.S. Cl.
CPC ......... *G06Q 10/1057* (2013.01); *G06F 9/547* (2013.01); *H04L 67/42* (2013.01)

(58) Field of Classification Search
CPC ............ H04L 41/0213; H04L 41/0253; H04L 41/0893; H04L 41/0233; H04L 41/0273;
(Continued)

(56) References Cited

U.S. PATENT DOCUMENTS 6,321,229 B1 11/2001 Goldman
6,678,887 B1 1/2004 Hallman
(Continued)

FOREIGN PATENT DOCUMENTS

WO 2015036817 A1 3/2015

OTHER PUBLICATIONS

Extended European Search Report for European Patent Application No. dated Dec. 16, 2019; 9 pgs.

*Primary Examiner* — Farzana B Huq
(74) *Attorney, Agent, or Firm* — Fletcher Yoder, P.C.

(57) ABSTRACT

The present approach relates to systems and methods for tracking a plurality of client actions within a portal running on a client instance and generating an analytics report that includes analytics information indicative of the tracked plurality of user actions and other events. The present approach includes receiving a user criteria specifying a web service integratable with an analytics package. The present approach further includes integrating the analytics package with the specified web service to leverage functionality of the specified web service, such as tracking functionality, to enhance tracking efficiency by causing the analytics package to selectively import analytics information from the web service. Furthermore, the present approach includes generating an analytics report that includes the analytics report may include analytics information indicative of user actions tracked by the analytics package or other analytics information imported from the web service by the analytics package.

18 Claims, 12 Drawing Sheets

(51) Int. Cl.
*G06F 9/54* (2006.01)
*H04L 29/06* (2006.01)

(58) Field of Classification Search
CPC . H04L 41/0816; H04L 43/04; H04L 43/0876;
H04L 43/10; H04L 67/02; H04L 67/22;
H04L 67/28; H04L 67/2838
USPC ................................ 709/217–218, 223–225
See application file for complete search history.

(56) References Cited

U.S. PATENT DOCUMENTS

| | | |
|---|---|---|
| 6,816,898 B1 | 11/2004 | Scarpelli |
| 8,151,261 B2 | 4/2012 | Sirota |
| 8,646,093 B2 | 2/2014 | Myers |
| 9,557,969 B2 | 1/2017 | Sharma |
| 9,819,729 B2 | 11/2017 | Moon |
| 2007/0067210 A1* | 3/2007 | Rishell ............... G06Q 30/0204 705/7.32 |
| 2008/0151767 A1* | 6/2008 | Moran ................ H04L 41/0893 370/252 |
| 2013/0297778 A1* | 11/2013 | Hong ...................... H04L 43/04 709/224 |
| 2015/0213484 A1 | 7/2015 | Amara et al. |
| 2015/0331948 A1* | 11/2015 | Arning ................. G06F 16/248 707/706 |

* cited by examiner 230
232

| MY TO-DOS | |
|---|---|
| TASK NAME—FIRSTNAME LASTNAME<br>HRC0001061 ASSIGNED TO YOU | WORK IN PROGRESS<br>UPDATED 1 DAY AGO |
| TASK NAME—FIRSTNAME LASTNAME<br>HRC0001023 ASSIGNED TO YOU | WORK IN PROGRESS<br>UPDATED 2 DAYS AGO |
| TASK NAME—FIRSTNAME LASTNAME<br>HRC0000966 ASSIGNED TO YOU | WORK IN PROGRESS<br>UPDATED 7 DAYS AGO |

| WIDGET TITLE GOES HERE |
|---|
| INSERT LINK NUMBER ONE HERE — 244 |
| INSERT ANOTHER LINK RIGHT HERE — 244 |
| AND WE GOT A LINK HERE TOO — 244 |
| LAST LINK PLACED HERE — 244 |

FIG. 12

| U.S. HOLIDAYS | |
|---|---|
| <u>2017</u>     <u>2018</u> | |
| INDEPENDENCE DAY | TUE JUL 04, 2017 |
| LABOR DAY | MON SEP 04, 2017 |
| COLUMBUS DAY | MON OCT 09, 2017 |
| VETERANS DAY | SAT NOV 11, 2017 |
| THANKSGIVING DAY | THU NOV 23, 2017 |
| CHRISTMAS EVE | SUN DEC 24, 2017 |
| CHRISTMAS DAY | MON DEC 25, 2017 |
| NEW YEAR'S EVE | SUN DEC 31, 2017 |
| | 📅 <u>ADD TO CALENDAR</u> |

SYSTEMS AND METHODS FOR GENERATING CAMPAIGN ANALYTICS

CROSS-REFERENCE TO RELATED APPLICATIONS

This application claims priority to U.S. Provisional Application No. 62/732,410, entitled "SYSTEMS AND METHODS FOR GENERATING CAMPAIGN ANALYTICS," filed Sep. 17, 2018, the disclosure of which is herein incorporated by reference in its entirety for all purposes.

BACKGROUND

The present disclosure relates generally to systems and methods for generating analytic information. In particular, the present disclosure generally relates to systems and methods for generating campaign analytic information in response to tracking user activity.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An enterprise or organization may include different departments (e.g. human resources (HR), information technology (IT), accounting, and so forth) that may operate in different locations (e.g., cities, states, countries), and each department typically includes members or employees having different roles (e.g., managers, assistants, associates, and so forth). Typically, enterprises may make available to their employees an electronic portal, which may function as an employee service center that enables the employees to engage with various features on the portal via a web-based interface. For example, the employees may engage with various applications, widgets, or features selectable through the portal to view desired information regarding their respective insurance plans, upcoming trainings, enterprise-wide announcements, and the like. In a similar fashion, the enterprises may create content accessible to clients (e.g., users who pay to access the content and benefit from services the enterprises offers) via a web-based interface allowing client interaction with features on a client portal. In this manner, clients may engage with the various features in the client portal.

In some contexts, enterprises may wish to determine information indicative of actions within various portals, such as activity within each of the client portals and each of the employee portals, for example, to improve the functionality, arrangement, timing, etc., of features and content present on those respective portals. Determining client and employee preferences by tracking their activities on their respective portals may be useful in improving these features and/or content. However, it may be difficult to track activity within a web-based interface of the portals to determine information indicative of actions (e.g., performed by employees associated with the enterprise and/or clients of the enterprise), in view of the operating conditions under which the clients and employees may operate and in view of the diverse range of actions the clients and employees associated with the enterprise are able to perform. Accordingly, there is a need to improve the information retrieved from clients and employees useful in determining user preferences within various portals, so that enterprises may modify their operations, to, at least enhance the user experience and efficiency by which the clients and employees engage with respective portals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates to systems and methods for tracking a plurality of client actions within a portal running on a client instance and generating an analytics report that includes analytics information indicative of the tracked plurality of user actions and other events. The present approach includes receiving a user criteria specifying a web service integratable with the analytics package. The present approach further includes integrating the analytics package with the specified web service to leverage functionality of the specified web service, such as tracking functionality, to enhance tracking efficiency by causing the analytics package to selectively import analytics information from the web service. The analytics report may include analytics information indicative of user actions tracked by the analytics package or other analytics information imported from the web service by the analytics package. In this manner, authorized personnel may use the analytics information from the analytics report to enhance the portal.

BRIEF DESCRIPTION OF THE DRAWINGS

Various aspects of this disclosure may be better understood upon reading the following detailed description and upon reference to the drawings in which:

FIG. 11 depicts an example of a window of to-do items on which the analytics package of FIG. 4 may be employed, in accordance with aspects of the present disclosure;

FIG. 12 depicts an example of a widget, including selectable links, on which the analytics package of FIG. 4 may be employed, in accordance with aspects of the present disclosure;

DETAILED DESCRIPTION OF SPECIFIC EMBODIMENTS

Figure 1:
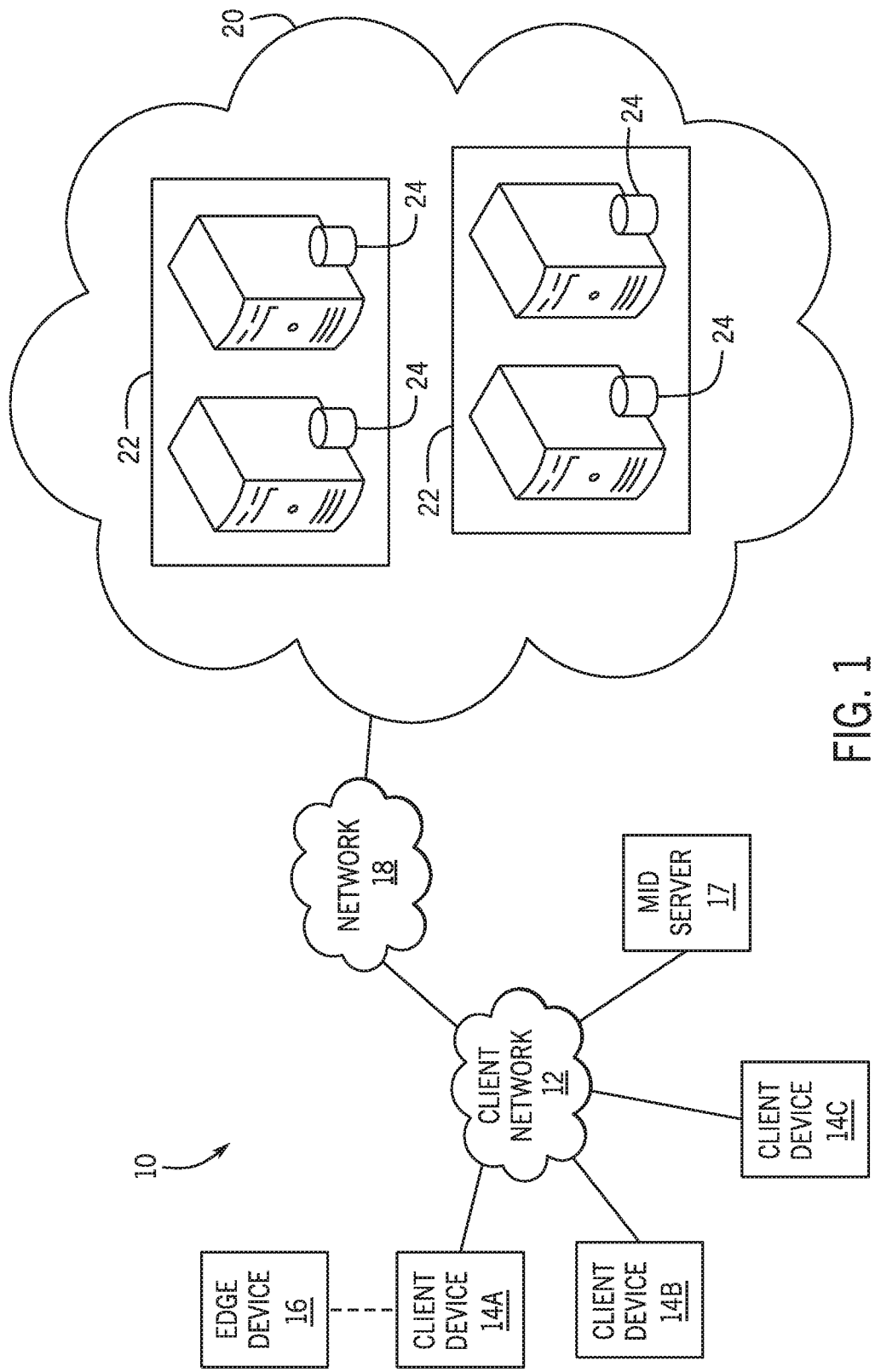
FIG. 1 is a block diagram of an embodiment of a cloud computing platform, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. In some embodiments, the computing system may employ any suitable circuitry, such as a processor-based device, memory devices, storage devices, and the like. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Furthermore, as used herein a "campaign" refers to a planned and coordinated dissemination of informational and/or actionable content to select users (i.e., "campaign participants" or "participants" as used herein) of an organization or enterprise. Hence, a campaign as used herein may include, but is not limited to, an informational campaign, a sign-up campaign, an awareness campaign, a safety campaign, and so forth, in which some or all of the individuals of an organization receive information and/or tasks in a coordinated or sequential manner. As used herein, "campaign items" relate to pre-configured or pre-determined campaign-related content (e.g., information and/or actions) pushed (e.g., sent) out to individuals of an organization (e.g., an enterprise) or a subset of the individuals via various content channels (e.g., web, E-mail, instant messaging (IM), etc.) in response to specified trigger events, such as events related to employment dates or anniversaries, organizational deadlines or target dates (e.g., open benefits enrollment), calendar-based events, holidays, life events (e.g., birthdays, anniversaries, and so forth); based on a request from personnel; and/or based on a determined identity of an individual (e.g., project manager, accountant, field operator, engineer, etc.) or any other suitable data. Examples of campaign items include content data associated with human resources (HR), information technology (IT), accounting, insurance, and the like, such as data or actions associated with health insurance, retirement plans, savings accounts, employee training, password management, and so forth.

As used herein, "campaign-related activities" refer to specific campaign-related content requiring action from an assigned (e.g., target) individual (i.e., a campaign participant). For example, an enterprise may assign and send new hired employees a campaign-related activity associated with accepting the terms and conditions of an assigned insurance policy. Since this campaign-related content requires an action (e.g., accepting the terms and conditions) by a participant, it may be referred to as a "campaign-related activity." The campaign items and/or campaign-related activities in the campaign may be sequentially associated to one another or organized in any suitable manner, such that completion of a campaign-related activity enables the participant to receive or have access to a subsequent campaign item or a subsequent campaign-related activity. Additionally or alternatively, the campaign items and/or campaign-related activities may be organized or connected in non-linear networks (e.g., webs) having many nodes that may define a plurality of paths, such that different paths along the campaign may be taken as the assigned participant completes campaign-related activities based on the identity of the participant, selected responses or actions to a given campaign-related activity (e.g., selection of an insurance plan from among several options), and so forth. For example, a first participant (e.g., a new hired employee) may be associated with a first campaign (or a first path along a campaign having web-like arrangement) having a first set of campaign items and campaign-related activities, while a second participant (e.g., a project manager having ten years of experience) may be associated with a second campaign (or a second path along a campaign having web-like arrangement) having a second set of campaign items and campaign-related activities. The first and second set of campaign items and campaign-related activities may be different from one another, include a subset of similar campaign items and campaign-related activities, or be identical.

Enterprises may make this campaign-related content available to their employees via an electronic employee portal, which may function as an employee service center that enables the employees to engage with various features on the portal via a web-based interface. In some instances, the web-based interface may include a browser for accessing the internet and accessing the portal via the internet, such as in contexts where the content or applications to be accessed are provided as part of a cloud-based platform. For example, the employees may engage with various applications, widgets, or features selectable through the portal to view desired information regarding their respective campaigns (e.g., insurance plans, upcoming trainings, enterprise-wide announcements, and so forth).

Additionally, the enterprises may create content accessible to clients (e.g., users who pay to access the content and benefit from services the enterprises offers) via the web-based interface allowing client interaction with features on a client portal. In this manner, clients may engage with the various features in the client portal.

As used herein, "users" is intended to refer to clients of the enterprise, employees of the enterprise, or any other person whose activities may be tracked using the embodiments disclosed herein. To facilitate discussion by distinguishing the persons whose actions on a portal are tracked from the people who are receiving information indicative of the tracked user actions with respect to a content event, as used herein, "authorized personnel" refers to people who receive the information indicative of the tracked user actions, and may include campaign managers, executives, and so forth. For example, authorized personnel may have access to the information indicative of the tracked user actions. To facilitate discussion, as used herein "user action" may refer to a corresponding content event (i.e., an action or occurrence detected by a program), which may include data indicative of any user action, such as, but not limited to, clicking a mouse button, pressing a key, filling out a text field, running out of memory, and so forth.

In some contexts, enterprises may wish to determine information indicative of user actions within various portals, such as activity within each of the client portals and each of the employee portals, for example, to improve the functionality, arrangement, timing, etc., of features present on those respective portals. Determining client and employee preferences by tracking their activities on their respective portals may be useful in improving the offered or displayed features. However, in a cloud-based platform or other instanced context, it may be difficult to track activity within a web-based interface to determine information indicative of actions within various portals, both for employees associated with the enterprise and for clients of the enterprise, in view of the diverse range of actions the clients and employees associated with the enterprise are able to perform. Accordingly, there is a need to improve prior techniques for retrieving information (from users) useful in determining user preferences within various portals, so that enterprises may modify their operations, to, at least enhance the user experience.

With this in mind, the present approach includes improving the tracking of user actions within a portal running on a client instance by employing an analytics package. Using the embodiments disclosed herein, an analytics package may be installed on a client device to enable a cloud computing platform to track analytics information indicative of user actions to then generate an analytics report that includes relevant analytics data associated with respect to one or more tracked targeted content events. As used herein, "the analytics package" refers to a set of computer script that may be installed on a computer system or application node accessible on a cloud-based platform and configured to a set of configured preferences to track user activity and generate an analytics report that includes information regarding an aggregation of the client actions performed on the client instance with respect to a certain targeted action.

In one implementation, the analytics package may integrate with the web service, such that the analytics package is added as an extension onto the web service. Selection of the extension may cause the analytics package to run and perform the functionality disclosed herein. For example, the analytics package may be realized as a plug-in (e.g., extension) that may be installed via a client device to enable tracking of user actions within the portal accessed through a client instance. After installing the analytics package, the analytics package may prompt the user to specify a client criteria, such as the portal being accessed by the user, the web service with which the analytics package will integrate with, and the like. In this manner, the analytics package may be installed on the client device based on the specified client criteria. It should be understood that in some embodiments, the analytics package is not manually installed by a user, and may alternatively be integral to the portal access via a client instance or may be installed by authorized personnel on the client instances.

Furthermore, the analytics package may track various user actions, such as a time duration a user accesses the portal or features within the portal, a number of times the portal or the features of the portal were accessed by the user, the devices used to access the portal or the features, the browser user to enable the access of the portal or the features, and so forth, as described in detail below. Furthermore, the analytics package may leverage the web service and import additional tracked user actions from the web service to enhance the analytics information. The analytics package may generate an analytics report that includes desired analytics information indicative of the plurality of user actions determined by the analytics package and the additional plurality of user actions retrieved by the analytics package from the web service, each with respect to one or more tracked targeted content events. Additional details with regard to the embodiments described herein will be discussed below with reference to FIGS. 1-15.

While the following discussion is generally provided in the context of a portal accessible to clients and employees associated with an enterprise, it should be understood that the embodiments disclosed herein are not limited to such specific contexts associated with these portals. Indeed, the provision of examples and explanations in such an application is to facilitate explanation by providing instances of real-world implementations and applications. It should be understood that the embodiments disclosed herein may be useful in other applications not limited to a client portal or an employee portal. For example, the embodiments disclosed herein may be useful in tracking user actions on any application, widget, or interface, as employed by any suitable enterprise to generate an analytics report with analytics information with respect to one or more tracked content events.

With the preceding in mind, and by way of context, the following figures relate to various types of generalized system architectures or configurations that may be employed to provide services to an organization in a multi-instance or multi-tenant framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing platform 10, such as a cloud computing system, where embodiments of the present disclosure may operate, is illustrated. The cloud computing platform 10 (e.g., cloud computing system) may include a client network 12, a network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that may include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices 14A-C and the platform 20. FIG. 1 also illustrates that the client network 12 includes a bridge device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (which may be referenced herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server (e.g., a unitary relational database management system (RDBMS) catalog).

To utilize computing resources within the platform 20, network operators may choose to configure the data centers 22 using a variety of computing infrastructures. In one embodiment, one or more of the data centers 22 are configured using a multi-tenant cloud architecture, such that one of the server instances handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from certain drawbacks, such as a failure of a particular one of the server instances causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
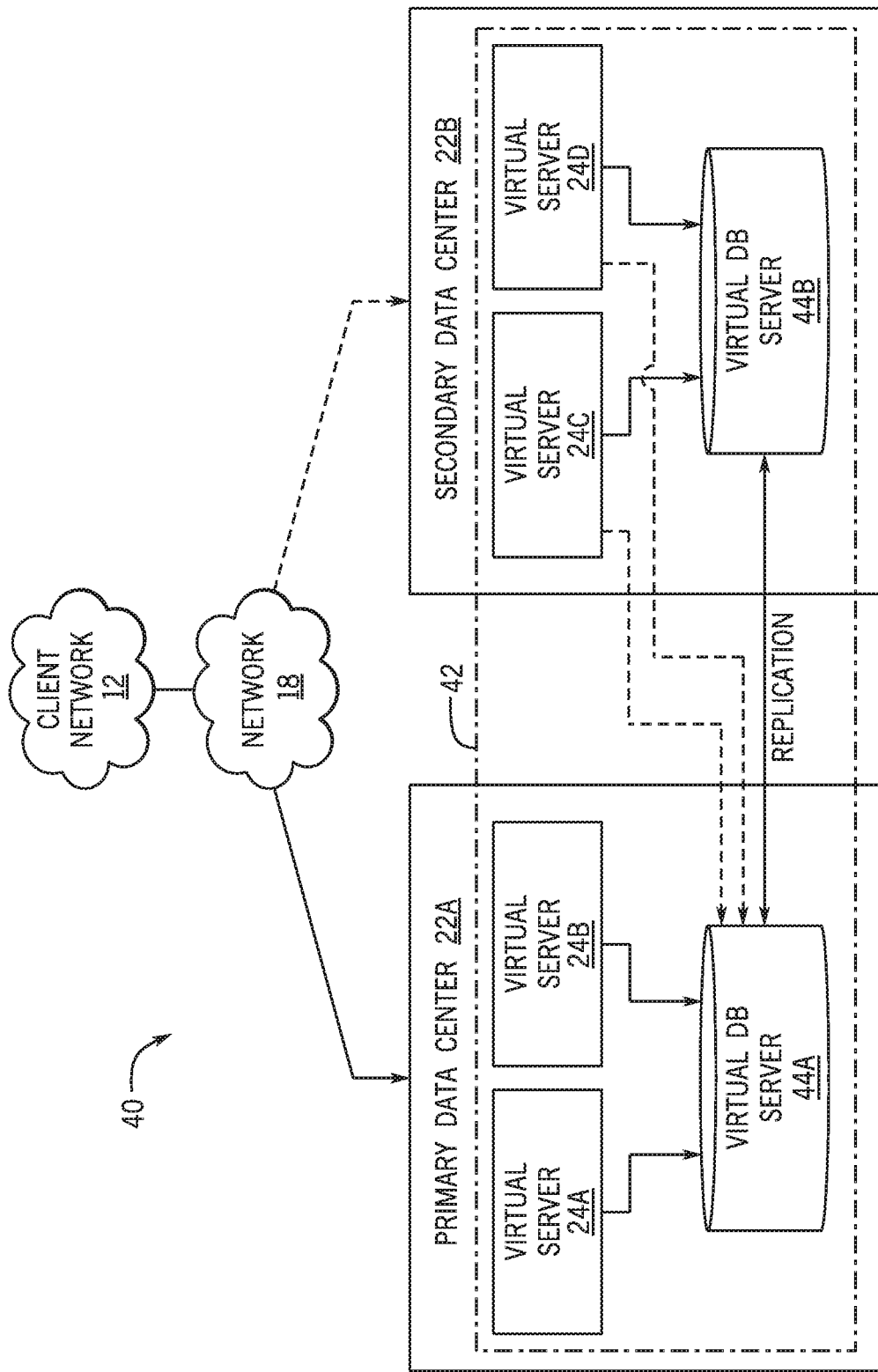
FIG. 2 is a block diagram of an embodiment of a multi-instance cloud architecture, in accordance with aspects of the present disclosure.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data may be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing platform 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For example, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, although virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
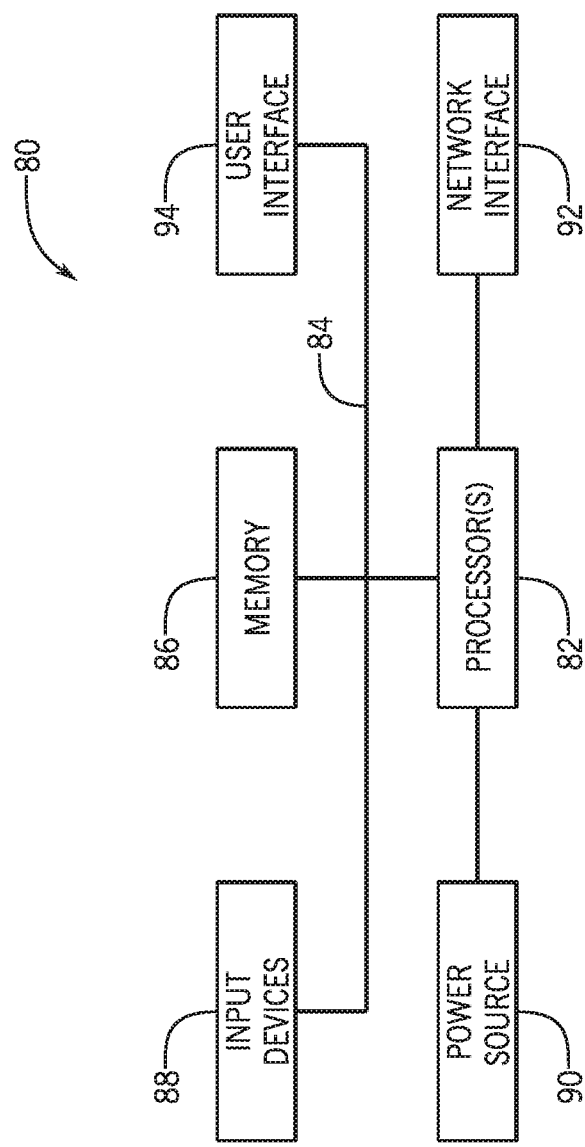
FIG. 3 is a block diagram of a computing device utilized in a cloud computing platform that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as those shown in FIG. 3, may be used in supporting or communicating with one or more virtual environments or computational instances on which the present approach may be implemented.

With this in mind, an example computer system may include some or all of the computer components depicted in FIG. 3 and may be present in the embodiments of FIGS. 1 and 2. FIG. 3 generally illustrates a block diagram of example components of a computing system 80 and their potential interconnections or communication paths, such as along one or more busses 84. As illustrated, the computing system 80 may include various hardware components such as, but not limited to, one or more processors 82, one or more busses 84, memory devices 86, input devices 88, a power source 90, a network interface 92, a user interface 94, and/or other computer components useful in performing the functions described herein. The one or more processors 82 may include one or more microprocessors capable of performing instructions stored in the memory devices 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory devices 86.

With respect to other components, the one or more busses 84 includes suitable electrical channels to provide data and/or power between the various components of the computing system 80. The memory devices 86 may include any tangible, non-transitory, and computer-readable storage media. Although shown as a single block in FIG. 1, the memory devices 86 can be implemented using multiple physical units of the same or different types in one or more physical locations. The input devices 88 correspond to structures employed to input data and/or commands to the one or more processor 82. For example, the input devices 88 may include a mouse, touchpad, touchscreen, keyboard, and the like. The power source 90 can be any suitable source for power of the various components of the computing system 80, such as a line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
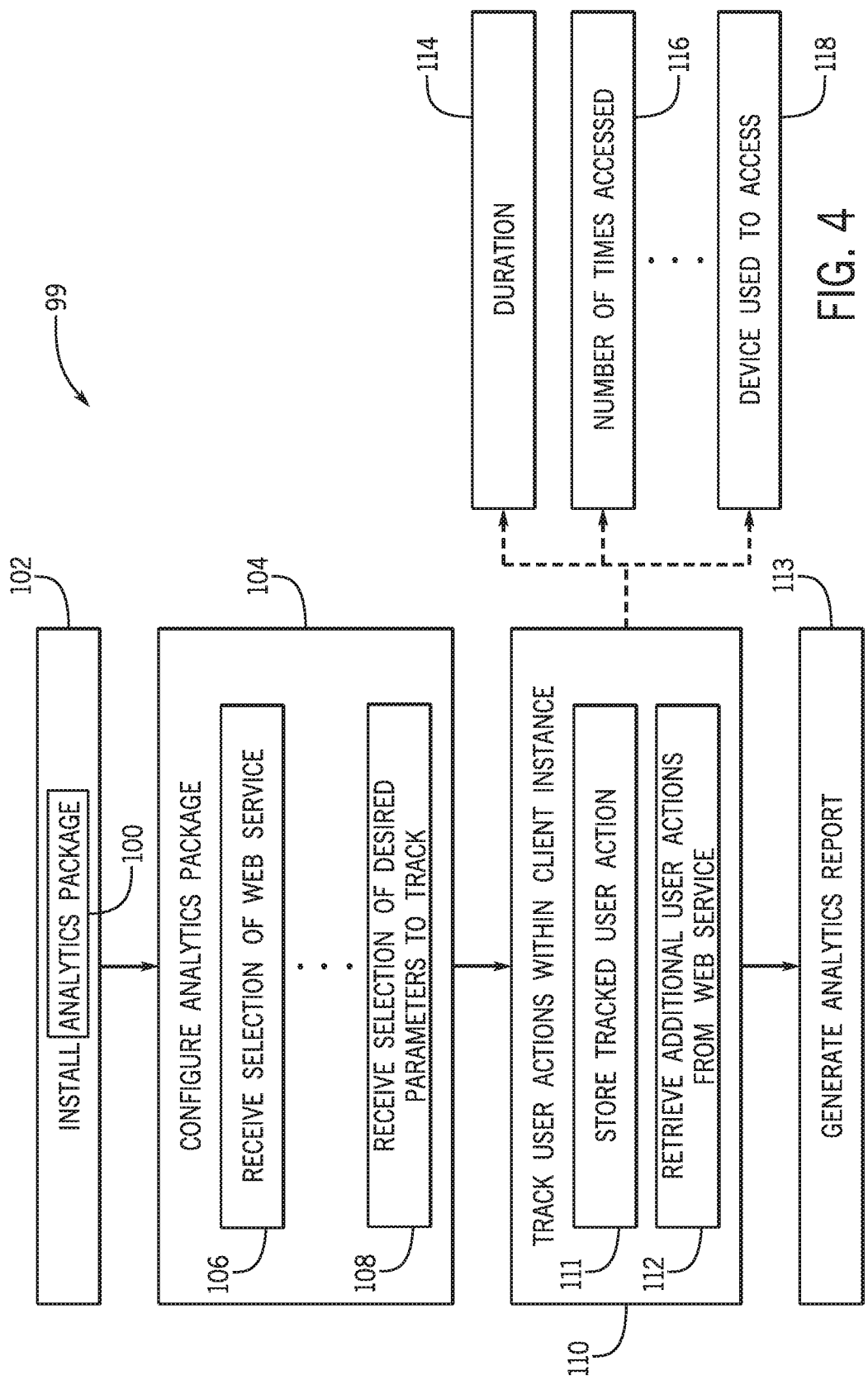
FIG. 4 is a flow diagram of steps performed in generating an analytics report by employing an analytics package to track user actions within one or more client instances, in accordance with aspects of the present disclosure.

With the preceding in mind, FIG. 4 is a flow diagram 99 of steps performed in generating an analytics report by employing an analytics package 100 to track user actions within a client instance 42, in accordance with aspects of the present disclosure. The steps illustrated in the flow diagram 99 may be performed by the cloud computing platform 10, by a client instance used by a client or employee of an enterprise, or on an application node of a client instance having access to the analytics package. In accordance with an embodiment, the analytics package 100 may track user actions with respect to one or more targeted content events, for example, to provide the enterprise with an analytics report, including information useful in improving accessibility and presentation of content to various users. Furthermore, the steps illustrated in the flow diagram 99 are meant to facilitate discussion and are not intended to limit the scope of this disclosure, since additional steps may be performed, certain steps may be omitted, and the illustrated steps may be performed in any order.

A client device 14 may receive a request to install the analytics package 100, which causes the cloud platform 10 to install (process block 102) the analytics package 100. In one embodiment, the analytics package 100 may be installed as a plug-in, which may include a software component that adds to an existing computer program, for example, a web browser used to access the user portal. In such embodiment, the web service supporting the plug-in may enable customization of the plug-in. The plug-in may be installed on a web service (e.g., that may track user actions within a web-based interface associated with the web service). In another embodiment, the analytics package 100 disclosed herein may be integral to the user portal or the web service, such that manual installation is not required.

The analytics package 100 may integrate with one of a plurality of web services. For example, the analytics package 100 may operate in accordance with a first, second, or third web service that are each integratable with the analytics package 100. The analytics package 100 may integrate with the first, second, or third web service to allow the exchange of analytics information to authorized personnel. That is, the analytics package 100 may leverage the first, second, or third web service to retrieve analytics information indicative of the user actions that is tracked with the first, second, or third web service, respectively.

In one embodiment, authorized personnel may cause the analytics package 100 to run on the web service as used by the clients and employees of the enterprise, such that the steps of the flow diagram 99 are transparent to a user. It should be understood that the authorized personnel, the users, or any other person associated with the enterprise may cause the analytics package 100 to integrate with a web service and run on the cloud-based platform 10. It may be beneficial for the user to specify various content events as part of configuring (process block 104) the analytics package 100, for example, to integrate with the specified web service.

To that end, in response to selection or installation of the analytics package 100, the client device 14 may prompt the user to make one or more user selections to configure (process block 104) the analytics package 100. In one example, a client device 14 may prompt the user to select (process block 106) the web service that the analytics package 100 will integrate with, such that the analytics package 100 integrates with the web service based on the selection (process block 106). In one implantation, integrating the analytics package comprises adding an extension (e.g., plug in) indicative of the analytics package to the web service, such that selection of the extension causes presentation of an Application File on the web service for executing the rest of the steps included in the flow diagram 99.

The client device 14 may enable the user to select (process block 106) whether the analytics package 100 will run with/on a web service. The analytics package 100 may be configured (process block 104) based on the receipt of the selection (process block 106) of the web service, such that selection of the web service causes the analytics package 100 to integrate with the selected web service. For example, the user may select between a first, second or third web service, and the cloud computing platform 10 may associate the user profile (e.g., of a corresponding client instance 42), the analytics package 100, and the selected web service, such that the client device 14 may run one tracking configuration record per client instance. In some contexts, this association may be realized via an industry standard architecture (ISA).

Additionally or alternatively, the analytics package 100 may be configured (process block 104) based on user selection (process block 108) of desired content events. The desired content events the user specifies may be included in the analytics information present on the analytics report generated by the analytics package 100, described below. In one embodiment, the user may specify the desired content events by selecting from a list of pre-generated content events that are presented to the user after installation of the analytics package 100. For example, the user may select from a list of content events that may include the number of page visits per time period, the number of pages open per session, the browsers used to access the portal, total time spend viewing the portal, the click rate, and the number of people a certain piece of content was forwarded to, to name a few, as described in detail below. However, it should be understood that the analytics package 100 may track any additional or alternative content events whether a user makes a selection of those content events or not. For example, certain user actions associated with certain content events may be tracked without user selection of those certain content events.

Furthermore, in some embodiments, an enterprise may make available or may limit client instances 42 corresponding to clients or employees associated with the enterprise based on the selection of the web service, the selection of the desired content events to track, or any other suitable settings configuration. In this manner, the enterprise may receive information indicative of the tracked user actions (e.g., client and employee actions) to better improve the content the employees and clients may engage with.

After the analytics package 100 is configured (process block 104) the analytics package 100, the cloud computing platform 10 may run the analytics package 100 on the client devices 14 to track (process block 110) user actions associated with the corresponding client instances 42 via a web browser. As described in detail below, the analytics package 100 may integrate with the web service, for example, based on receipt (process block 106) of the user selection specifying the web service, and may track (process block 110) the client actions, for example, based on receipt (process block 108) of the user selection of the desired content events. In some contexts, the analytics package 100 may track (process block 110) a duration (block 114) of time spent accessing content via a portal, a number of times the content is accessed (block 116), and the devices user to access the content (block 118), just to name a few.

In some contexts, the analytics package 100 may leverage the ISA to receive an indication of the user action, and assemble a tracking profile that includes information related to that tracked action within the portal. For example, in response to an indication of a user action, such as clicking on a uniform resource locator (URL), the analytics package 100 may leverage the ISA to determine the URL selected by the user, the length of time the user spent accessing the URL, the application programming interface (API) token, and the like.

Additionally, configuring (process block 104) the analytics package 100 may include adding an application file table in which tracked user actions may be stored (process block 111). The analytics package 100 may store (process block 111) the tracked (process block 110) client actions (e.g., in a virtual database server 22 or memory device 86), as discussed in detail below with regard to FIG. 7. Furthermore, as described above, the analytics package 100 may leverage the web service and import (process block 112) additional tracked user actions from the web service to enhance the analytics information. For example, the analytics package 100 may employ Asynchronous JavaScript (AJAX) to call on the client side to facilitate tracking browser activity. While the AJAX may be employed to call on the client-side to track browser activity, it should be understood that the tracked events may be stored elsewhere on the cloud computing platform 10. In another example, the analytics package 100 may employ Representational State Transfer (REST) application programming interface (API) to call on the server-side to track email activity.

The analytics package 100 may generate (process block 113) an analytics report that organizes the tracked user actions in an easy to read document (e.g., as a table, sectioned lists, graphs, etc.). For example, the analytics package 100, when executed on a cloud computing platform 10, may track (process block 110) content events (indicative of user actions) such as the duration (block 114) of time spent accessing content (e.g., a portal), the number of time the content is accessed (block 116), the devices user to access the content (block 118). In response to the analytics package 100 receiving (process block 108) an instruction that the desired content events include the duration (block 114) and the number of time the content was accessed (block 116), the analytics package 100 may retrieve information associated with the client actions indicative of these desired content events to generate (process block 113) an analytics report that includes this desired information. It should be understood that in some embodiments the analytics report generated by the analytics package 100 may include only a subset of the total tracked user actions. For example, the analytics package 100 may filter through the tracked user actions, based on the selections (e.g., blocks 106 and 108) used for configuring the analytics package 100, to generate (process block 113) the analytics report, such that the analytics report only includes information associated with the client actions indicative of the desired content events associated with specific client devices 14, specific client instances 42, or specific application nodes of a client instance. In one implementation, the identity of the users who performed the user action that is tracked may be omitted, such that the tracked user actions are anonyms with respect to the user who performed the action.

Figure 5:
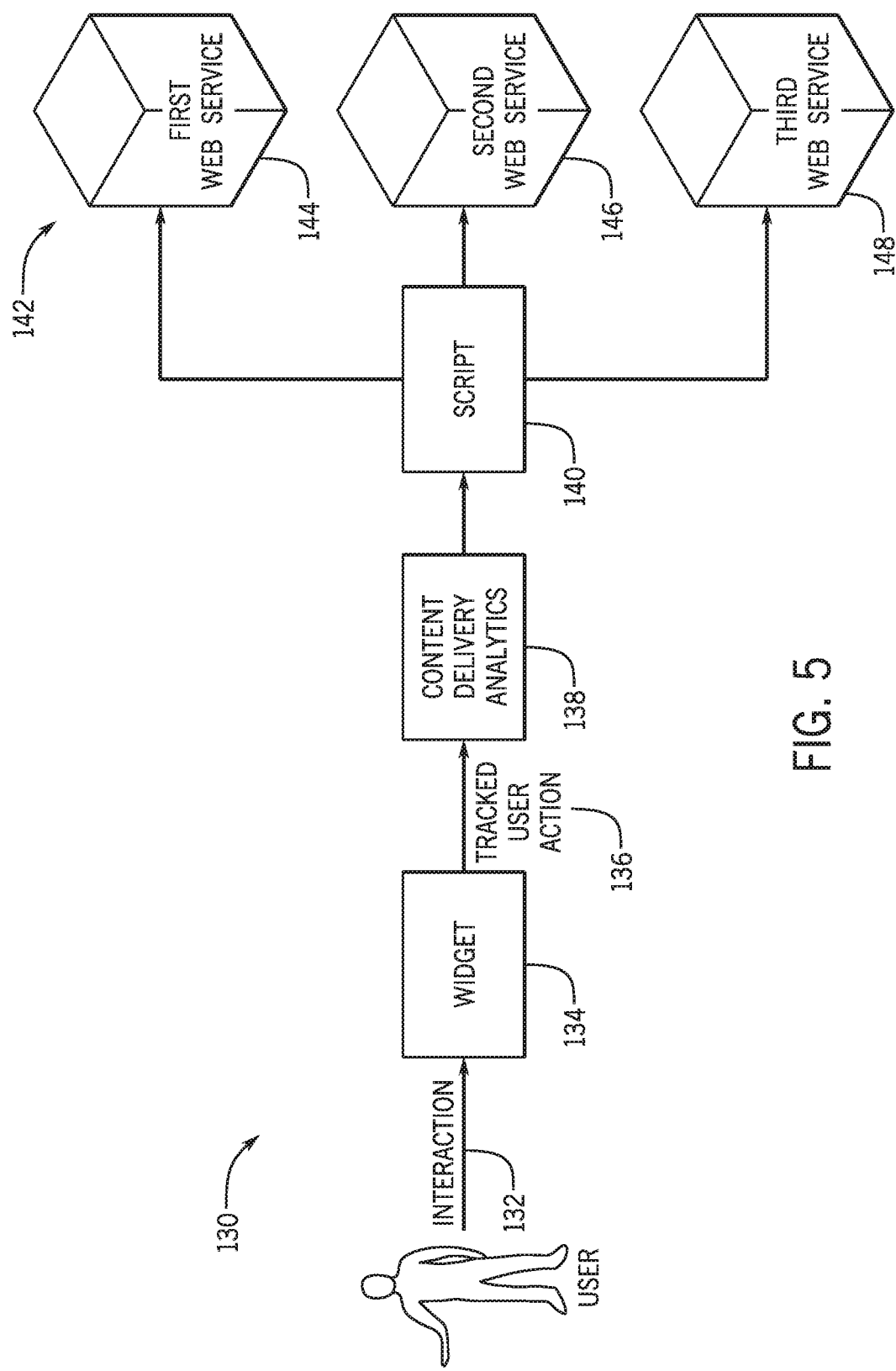
FIG. 5 is a flow diagram of steps performed in tracking user actions by employing the analytics package of FIG. 4 operating integrally with a web service, in accordance with aspects of the present disclosure.

FIG. 5 is a flow diagram 130 of steps performed in tracking (process block 110; FIG. 4) user actions by employing the analytics package 100 operating within a cloud computing system 10, in accordance with aspects of the present disclosure. Specifically, the illustrated flow diagram 130 may be useful for tracking user actions on a web-based interface (e.g., browser used to access a portal). For example, the process illustrated in the flow diagram 130 may facilitate determining analytics information associated with a content delivery package or a content automation package that may include content delivered and accessible via the web-based interface. To help illustrate, flow diagram 130 is discussed in the context of interacting with a widget of the client portal or the employee portal discussed above. In response to a user interaction 132 with respect to a feature on the portal, such as a widget 134, the analytics package 100 may determine that a tracked user action 136 has occurred based on the user interaction 132. The analytics package 100 may cause the client device 14 to communicate the tracked user action 136 to a content delivery analytics feature 138 that may associate the tracked user action 136 with a campaign, when the user interaction is associated with (or part of) a campaign.

In some embodiments, the analytics package 100 may transcribe the tracked user action 136 into a target scripting language 140 (e.g., JavaScript) that may be leveraged on one of a plurality of web services 142. For example, the analytics package 100 may transcribe the tracked user action 136 into the target scripting language 140 (e.g., JavaScript) that may be used by a first web service 144, a second web service 146, or a third web service 148. The first, second, and third web services 144, 146, 148 may store the tracked user actions 136 defined by the target scripting language 140 according to the storing methods employed by the first, second, or third web services 144, 146, 148, respectively.

In one example, the third web service 148, while running the analytics package 100, may store (process block 111; FIG. 4) the tracked user action 136 in one or more buffers, as discussed above. After a buffer becomes full (or after the number of records in the buffer reaches a threshold value), the analytics package 100 may cause the tracked user actions 136 to be stored in another buffer. In some implementations, after a buffer is full (or after the number of records in the buffer reaches a threshold value), the analytics package 100 may send the tracked user actions 136 via Representational State Transfer (REST) API to the database server 22. That is, the analytics package 100 may leverage the first web service 144, second web service 146, or any other web service 142 to store the tracked user actions 136 in the database server 22 and then generate the analytics report by using the stored tracked user actions 136.

Figure 6:
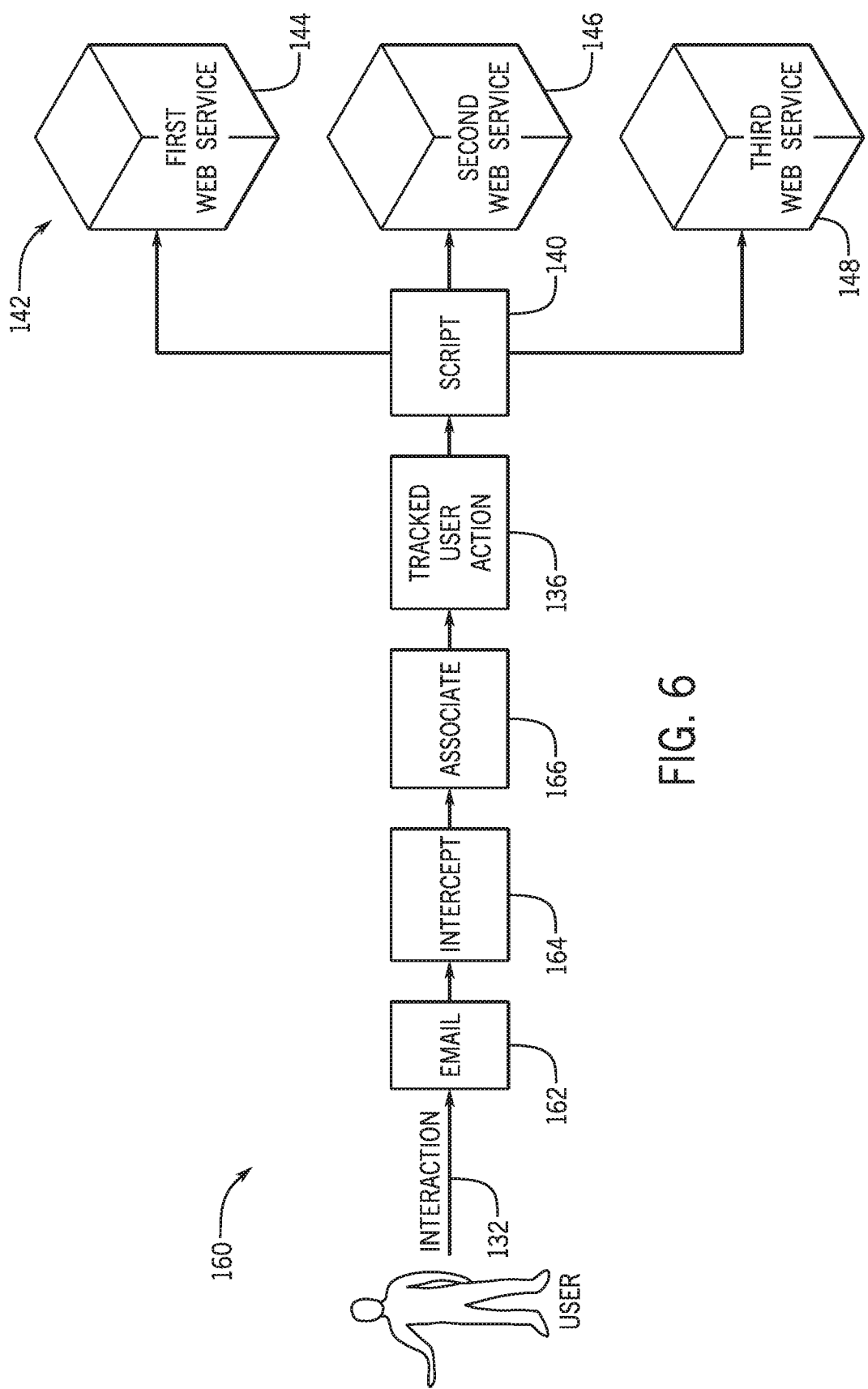
FIG. 6 is a flow diagram of steps performed in tracking user actions by employing the analytics package of FIG. 4 operating integrally with a web service, in accordance with aspects of the present disclosure.

FIG. 6 is a flow diagram 160 of steps performed in tracking user actions 136 by employing the analytics package 100 operating within a web service 142, in accordance with aspects of the present disclosure. The process illustrated in the flow diagram 160 may be useful in tracking user actions on an E-mail application. For example, the process illustrated in the flow diagram 160 may facilitate determining analytics information associated with a content delivery package or a content automation package that may include content delivered via the E-mail application. To help illustrate, flow diagram 160 is discussed in the context of interacting with an E-mail application accessible via the client device 14 and associated with the client portal or the employee portal discussed above, but it should be understood that the flow diagram 160 may be useful in tracking user actions on any web-based application.

In response to a user interaction 132 (e.g., opening the E-mail application or selecting a features, such as a link, within the E-mail application) with respect to an E-mail application 162, the analytics package 100 may intercept (process block 164) an indication indicative of the E-mail application 162 opening up or indicative of the user interaction within the E-mail application 162. In certain contexts, when an enterprise sends campaign-related content to a user via E-mail or when the client device 14 is configured to automatically send campaign-related content to the user via E-mail, intercepting (process block 164) the indication may include associating (process block 166) the performed user action as related to the campaign with the tracked user actions. For example, the client device 14 may automatically send campaign-related content, such as a link, via the E-mail application to the user. When the user opens the campaign-related content via the E-mail application, the analytics package 100 may intercept (process block 164) the indication indicative of the user opening up the E-mail and may associate user selection of the link with the tracked user action 136, such that the tracked user actions 136 may be associated with certain campaigns.

In some embodiments, the analytics package 100 may transcribe the tracked user action 136 (and its association to a campaign) into a target scripting language 140 (e.g., JavaScript) that may be leveraged on one of a plurality of web services 142. For example, the analytics package 100 may transcribe the tracked user action 136 (and its association to a campaign) into the target scripting language 140 (e.g., JavaScript) that may be used by a first web service 144, a second web service 146, or a third web service 148. The first, second, and third web services 144, 146, 148 may store the tracked user actions 136 defined by the target scripting language 140 according to the storing methods employed by the first, second, or third web services 144, 146, 148, respectively. In one embodiment, only one web service 142 may be active at a time per client instance. While the illustrated embodiment includes three webs services 142, from which one web service integrates with the analytics package 100, it should be understood that the analytics package 100 may integrate with any additional or alternative web services.

In one example, the third web service 148, while running the analytics package 100, may store the tracked user action 136 in one or more buffers, as discussed above. After a buffer becomes full (or after the number of records in the buffer reaches a threshold value), the analytics package 100 may cause the tracked user actions 136 to be stored in another buffer. In some implementations, after a buffer is full (or after the number of records in the buffer reaches a threshold value), the analytics package 100 may send the tracked user actions 136 via Representational State Transfer (REST) API to the database server 22. That is, the analytics package 100 may leverage the first web service 144, second web service 146, or any other web service 142 to store the tracked user actions 136 in the database server 22 and then generate the analytics report by using the stored tracked user actions 136.

Figure 7:
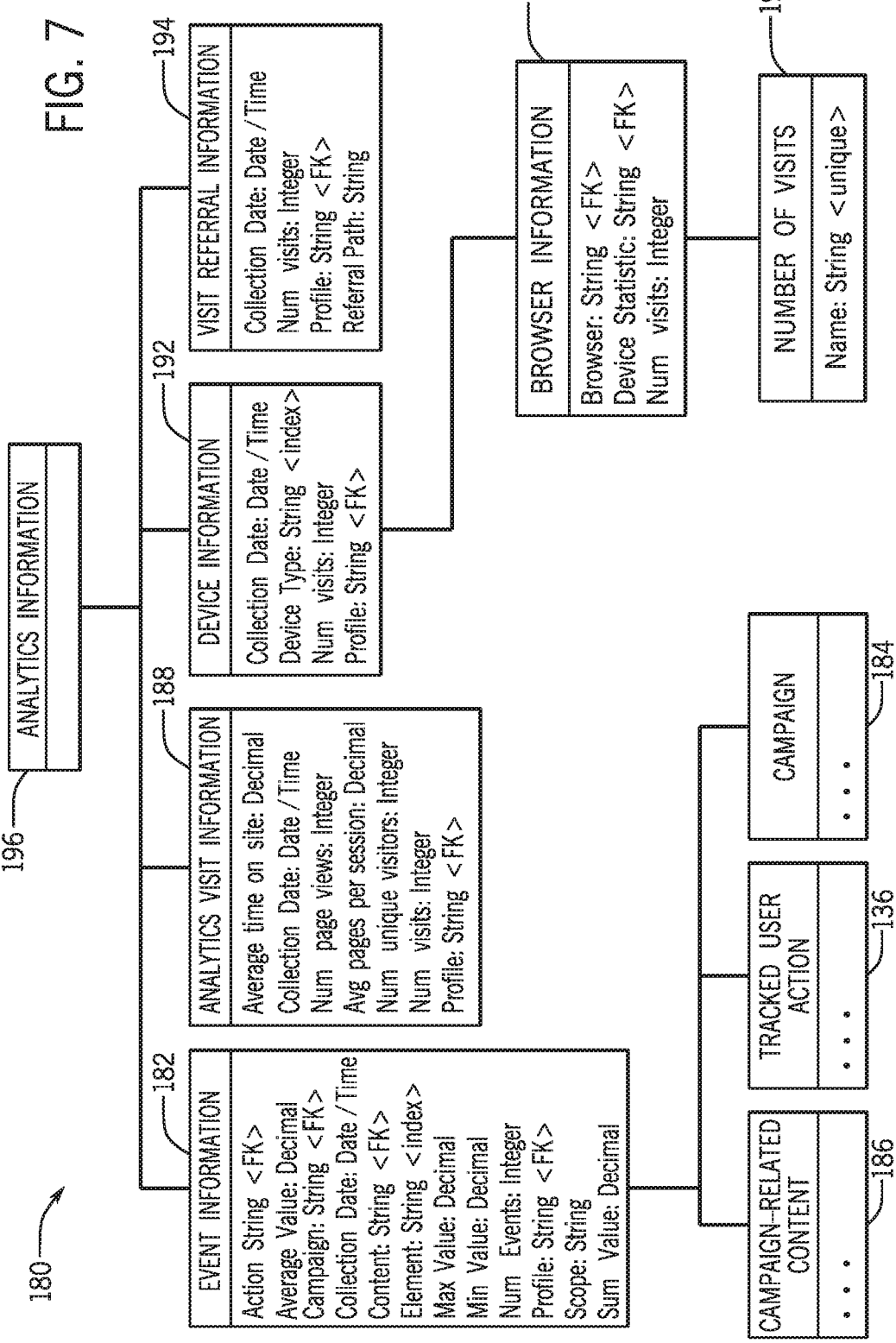
FIG. 7 is a flow diagram of a process for compiling and storing information indicative of tracked user actions, in accordance with aspects of the present disclosure.

FIG. 7 is a flow diagram 180 of a process for compiling and storing information indicative of the tracked user actions 136, in accordance with aspects of the present disclosure. In one embodiment, the analytics package 100 may track event information 182. The event information 182 may include information indicative of a campaign 184, a campaign-related content 186, and a user action 136 engaging with the campaign-related content 186. In addition or alternatively, the analytics package 100 may track analytics visit information 188, which may include the average time spent on a piece of content, the time and date that the piece of content was accessed, the number of content pages viewed, the average number of content pages opened per session, the number of unique users who visit a content page, the number of visits, and the like. The analytics package 100 may also track the number of visits 190, browser information 191 (e.g., information indicative of the browser used to access a piece of content, including a name of the browser, a statistic about the browser, etc.) and the device information 192 (e.g., information indicative of the device used to access the browser, the type of device, the time and date the device accessed the content via the browser, etc.). The analytics package 100 may also track visit referral information 194 (e.g., information indicative of content referred by one user to another user, which may include the date the referral was submitted, the number of times the another user engaged with the referred content, the referral path, etc.).

As mentioned above, in one embodiment, the tracked user action may be imported from one of a plurality of web services. In another embodiment, the analytics package 100 may track the user actions 136 to determine the information illustrated in FIG. 7. In some embodiments, the analytics package 100 may cause the cloud computing platform 10 to store over 10,000 records. By way of example of this storage capacity, the event information 182 may include a record for each of five campaigns at a time, four pieces of campaign-related content per campaign, two events per campaign-related content, two elements per campaign-related content, and two websites (e.g., an open browser accessing the portal, another open browser accessing any suitable information). The analytics visit information 188 may include one record for each for each of two sites (e.g., client or employee portals, etc.) per day. The device information 192 may include one record for each of four device records (e.g., each device record corresponding to a device, such as a tablet, mobile device, desktop, laptop, etc.) for each of two sites (e.g., client or employee portals, etc.). In another example, the browser information 191 may include one record for each of four device records for each of four browsers (e.g., a first, second, third, and fourth browser) used to access each of two sites. These examples are used to illustrate that the analytics package 100 is able to cause the cloud computing platform 10 to retrieve and store the above-referenced information associated with the user actions in one or more large tables. Continuing the above examples, tracking the above-referenced information may cause 132 records to be stored per day, such that the stored records may exceed 10,000 records over a 75 day period.

While the embodiments disclosed herein are able to store all this information in the virtual database server 22 or the memory device 86, the analytics package 100 may employ one or more buffers to facilitate storage of the tracked user actions. In one embodiment, the user actions may be tracked in installment segments. For example, the analytics package 100 may track user actions until the tracked user actions fill a first buffer or reach a threshold number of records within the buffer. In response to the number of records stored in the buffer filling the entries in the first buffer or reaching a threshold number of records in the first buffer, the analytics package 100 may cause additional tracked user actions to be stored in a second buffer. In addition or alternatively, in response to the number of records stored in the one or more buffers filling the entries in one or more buffers, or in response to the number of records stored in the one or more buffers reaching a threshold number of records in the one or more buffer, the analytics package 100 may store the records from the buffer in the virtual database server 22 or the memory device 86. In this manner, the number of requests to import the tracked information from the web services and/or the number of requests to store the tracked information in the virtual database server 22 or the memory device 86 may be reduced, which may increase the efficiency and reliability of the information stored in the virtual database server 22 or the memory device 86.

By way of example regarding the types of tracked user actions that may be tracked and included in the analytics report, FIGS. 8-16 include various types of content from which user actions may be tracked by employing the analytics package 100 of FIG. 4. In one embodiment, these tracked user action or a portion of these tracked user actions may be imported from the web service. In another embodiment, these tracked user actions or a portion of these tracked user actions may be tracked by the analytics package 100. Furthermore, it should be understood that the tracked user actions may be organized in the analytics report in any suitable manner, for example, such that a portion of the tracked user actions are expressed as a percentage, a rate, an aggregate amount (e.g., a total number), ratios, and the like.

Figure 8:
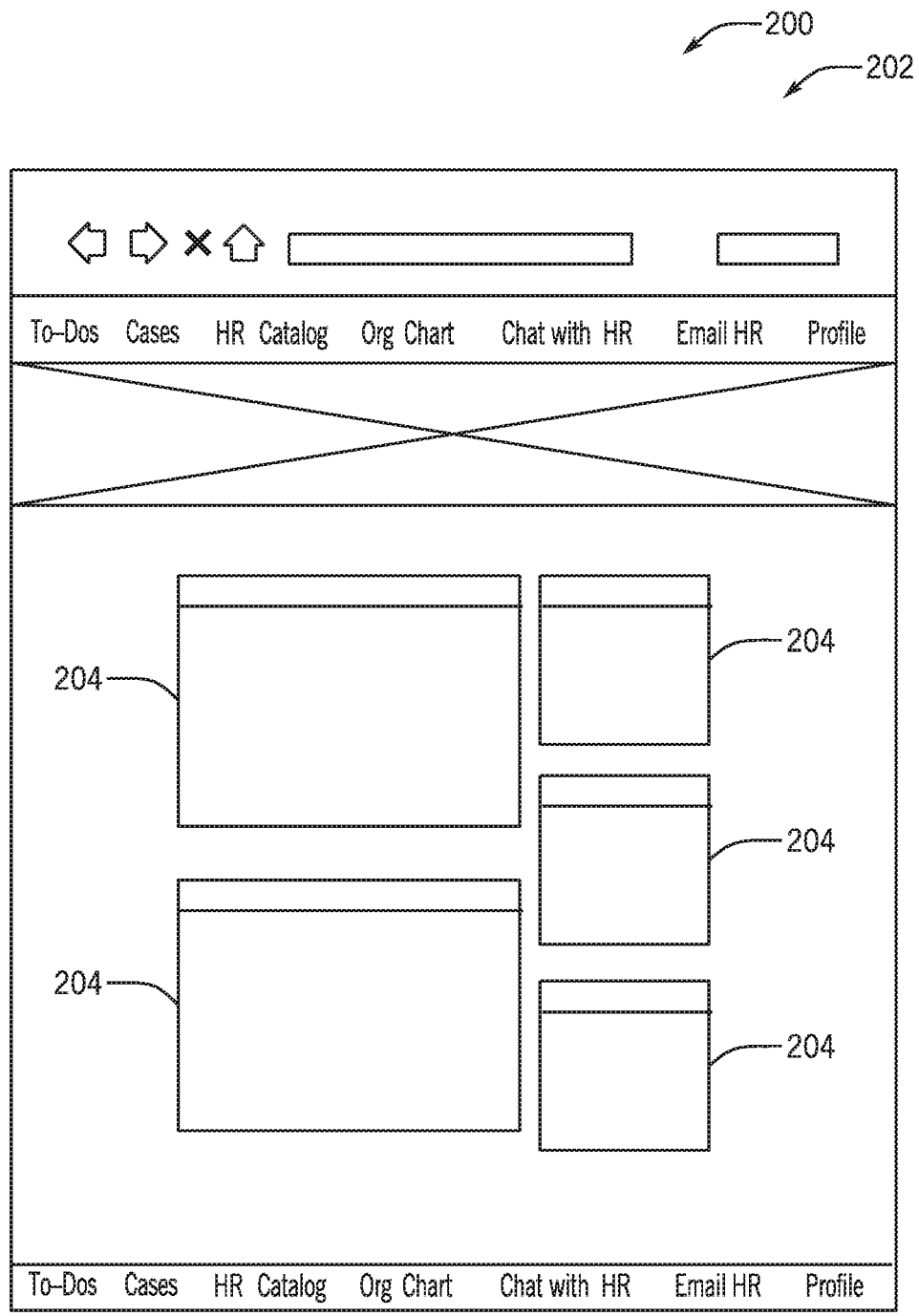
FIG. 8 depicts an example of a user portal on which the analytics package of FIG. 4 may be employed, in accordance with aspects of the present disclosure.

With this in mind, FIG. 8 depicts an example of a screenshot 200 of a user portal 202 on which the analytics package 100 of FIG. 4 may be employed, in accordance with aspects of the present disclosure. As discussed above, the user portal may be accessed via the client instance 42. As discussed above, the analytics package 100 may be realized via a plug-in that may be installed on the client device 14 to enable tracking of user actions within the user portal 202 accessed through a client instance 42. In some embodiments, the analytics package 100 may integrate with a web service to facilitate this tracking. The analytics package 100 may track a plurality of information, including the number of visits (e.g., sessions) that users access the user portal 202 via associated client instances, the number of unique visitors (e.g., users), the number of pages 204 the user engages with per session, the duration per session, the links referred to other users via the user portal 202, the browsers used to access the user portal 202, the devices used to access the user portal 202, the paths taken by users to access the user portal 202, the total number of views (e.g., which may be broken down into the views for a given day, week, month or year), just to name a few.

Figure 9:
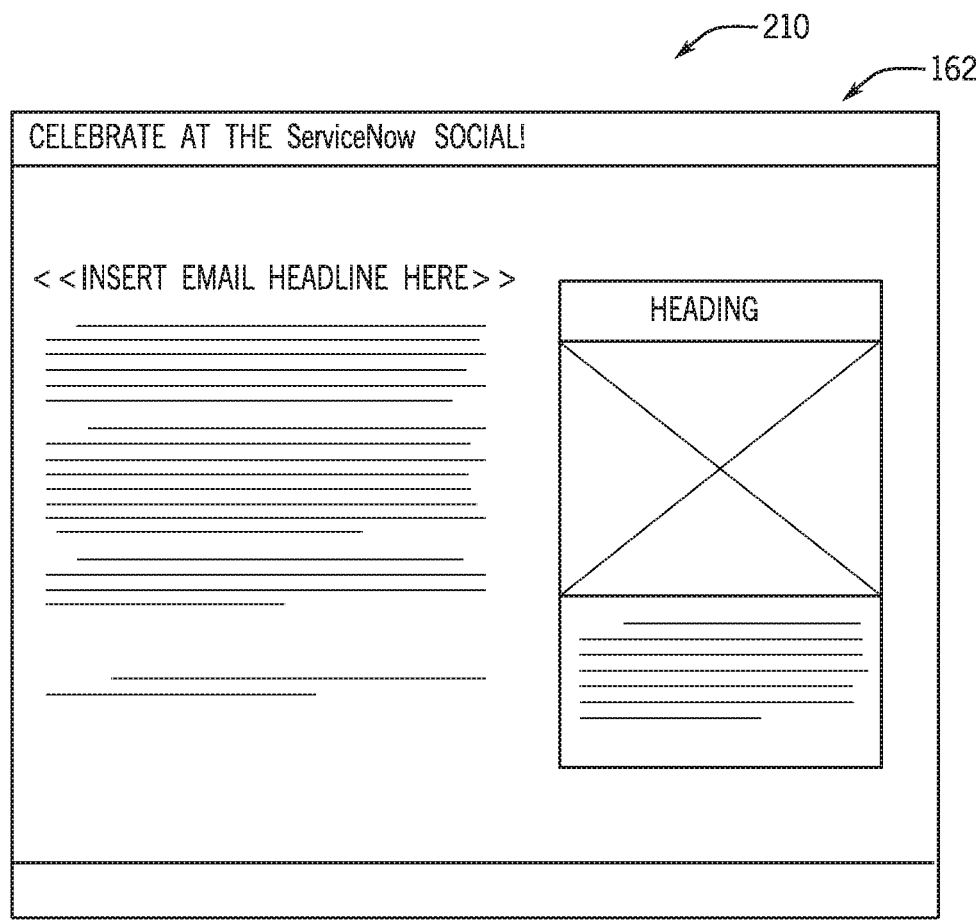
FIG. 9 depicts an example of an E-mail application on which the analytics package of FIG. 4 may be employed, in accordance with aspects of the present disclosure.

FIG. 9 depicts an example of a screenshot 210 of an E-mail application 162 on which the analytics package 100 of FIG. 4 may be employed, in accordance with aspects of the present disclosure. The analytics package 100 may track user actions or import tracked user action associated with user actions within the E-mail application 162. For example, tracked user actions associated with user actions within the E-mail application 162 may include information regarding who the E-mail was sent to, the number of successful delivered E-mails, the number of unsuccessful delivered E-mails, the number of E-mails opened, the clicks within the E-mail application, the top selected links selected via the E-mail application 162, and/or the total number of views (e.g., which may be broken down into the views for a given day, week, month or year), to name a few.

Figure 10:
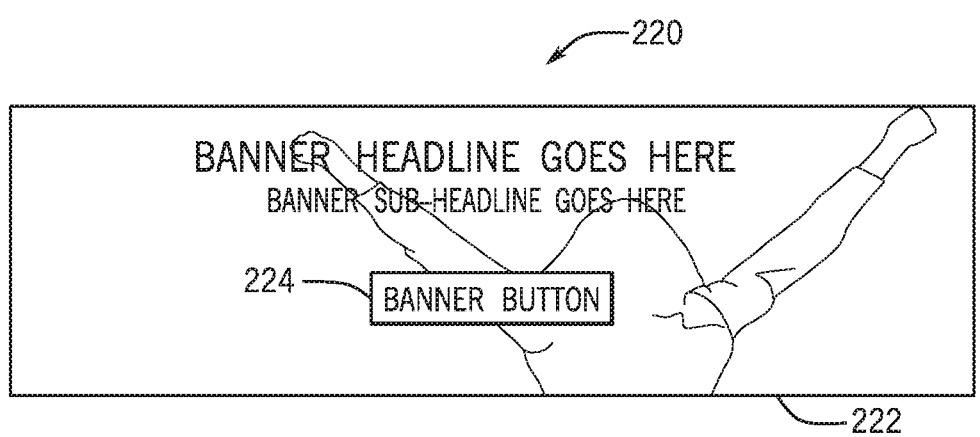
FIG. 10 depicts an example of a banner on which the analytics package of FIG. 4 may be employed, in accordance with aspects of the present disclosure.

FIG. 10 depicts an example of a screenshot 220 of a banner 222 on which the analytics package 100 of FIG. 4 may be employed, in accordance with aspects of the present disclosure. The analytics package 100 may track the user actions or import tracked user action associated with user actions with the banner 222. For example, the tracked user actions associated with user actions with the banner 222 may include information regarding the total impressions associated with the banner 222, the unique impressions associated with the banner 222, and/or the total number of views (e.g., which may be broken down into the views for a given day, week, month or year), just to name a few. In certain embodiments in which the banner 222 includes a selectable button 224, the tracked user actions associated with user actions with the banner 22 may include information regarding the total click through for the selectable button 224 and/or the unique click through for the selectable button 224, to name a few.

FIG. 11 depicts an example of a screenshot 230 of a window 232 of to-do items 234 on which the analytics package 100 of FIG. 4 may be employed, in accordance with aspects of the present disclosure. The analytics package 100 may track the user actions or import tracked user action associated with the window 232 of to-do items 234. For example, the tracked user actions may include information regarding the completed and/or uncompleted to-do items 234, the total impressions, the unique impressions, the total click throughs, and/or the unique click throughs associated with the window 232 or the to-do items 234, to name a few.

FIG. 12 depicts an example of a screenshot 240 of a widget 242, including selectable links 244 (e.g., URLs), on which the analytics package 100 of FIG. 4 may be employed, in accordance with aspects of the present disclosure. The analytics package 100 may track the user actions or import tracked user action associated with the user engaging with the widget 242 and the corresponding selectable links 244. For example, the tracked user actions may include information regarding the total number of link views (e.g., which may be broken down into the views for a given day, week, month or year), the total impressions, the unique impressions, the total click throughs, and/or the unique click throughs associated with the selectable links 244, to name a few.

Figure 13:
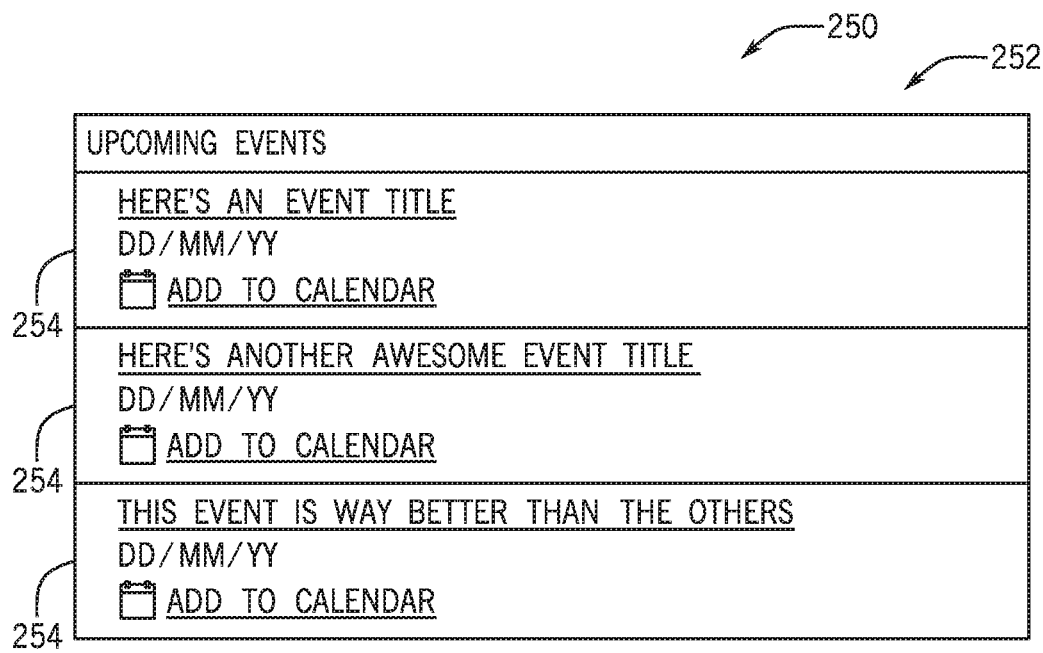
FIG. 13 depicts an example of a window of calendar events on which the analytics package of FIG. 4 may be employed, in accordance with aspects of the present disclosure.

FIG. 13 depicts an example of a screenshot 250 of a window 252 of calendar events 254 on which the analytics package 100 of FIG. 4 may be employed, in accordance with aspects of the present disclosure. A user may engage with the calendar events 254, for example, to view more details about the calendar event, add the calendar event to another calendar application, and the like. The analytics package 100 may track these user actions (and others) or import these tracked user action (and others) associated with the user engaging with the window 252 of calendar events 254 and the corresponding calendar events 254. For example, the tracked user actions may include information regarding the total number of views (e.g., which may be broken down into the views for a given day, week, month or year), the total impressions, the unique impressions, the total click throughs, the total download click through, the unique click throughs, and/or the expand rate associated with the window 252 of calendar events 254, to name a few.

Figure 14:
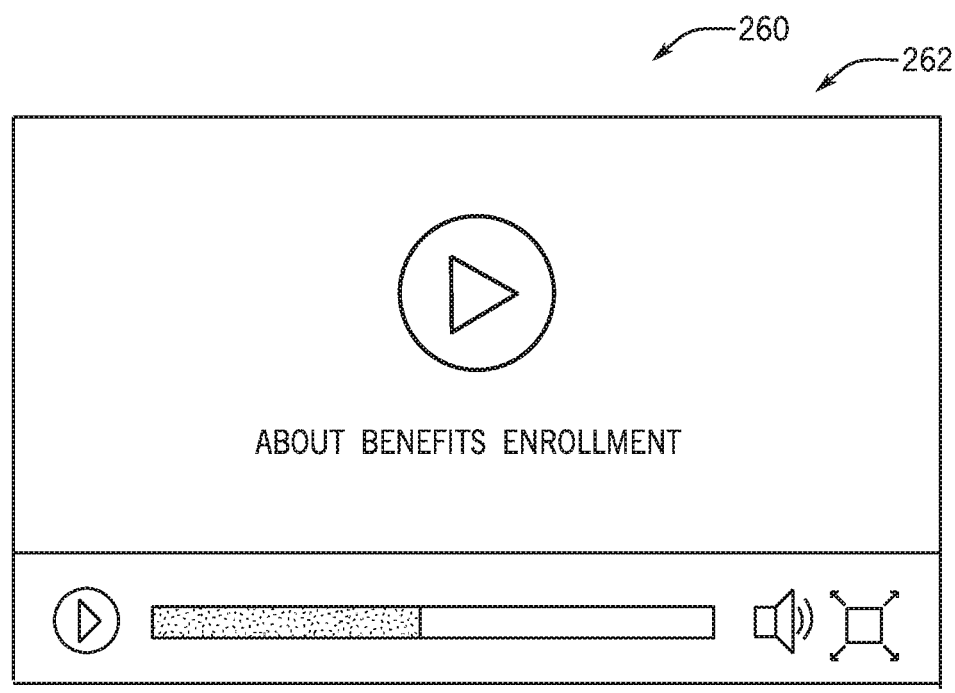
FIG. 14 depicts an example of a video pane on which the analytics package of FIG. 4 may be employed, in accordance with aspects of the present disclosure.

FIG. 14 depicts an example of a screenshot 260 of a video 262 on which the analytics package 100 of FIG. 4 may be employed, in accordance with aspects of the present disclosure. A user may engage with the video 262 in a variety of ways, for example, by playing or viewing the video. The analytics package 100 may track or import user actions associated with the user engaging with the video 262. For example, the tracked user actions may include information regarding the total number of views (e.g., which may be broken down into the views for a given day, week, month or year), the total impressions, and/or the unique impressions associated with the video 262, to name a few.

Figures 15, 16:
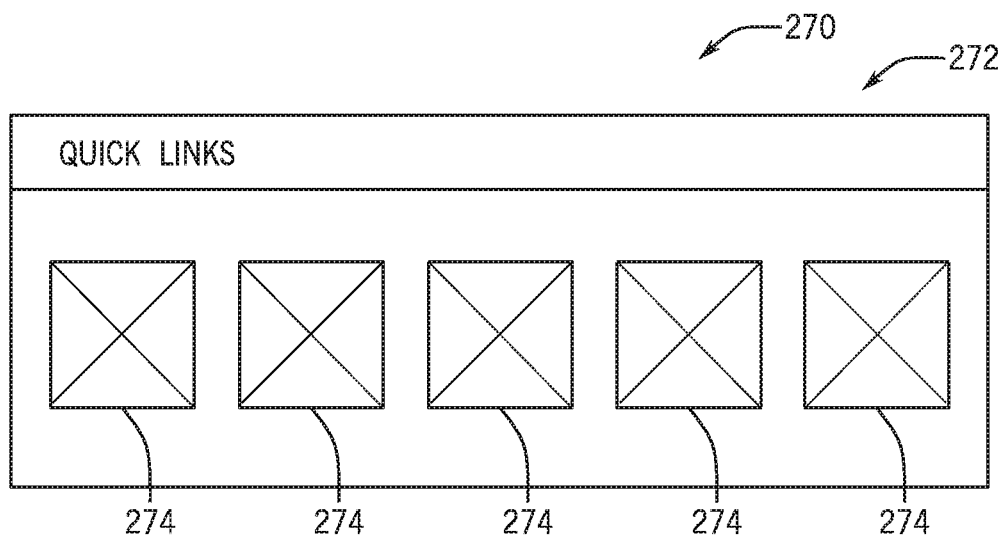
FIG. 15 depicts an example of a window of selectable image-based links on which the analytics package of FIG. 4 may be employed, in accordance with aspects of the present disclosure.
FIG. 16 depicts an example of a calendar on which the analytics package of FIG. 4 may be employed, in accordance with aspects of the present disclosure.

FIG. 15 depicts an example of a screenshot 270 of a window 272 of selectable image-based links 274 on which the analytics package 100 of FIG. 4 may be employed, in accordance with aspects of the present disclosure. The image-based links 274 may be selectable images that include embedded URLs (e.g., hyperlinks) that are selected when the user selects the image-based link 274. The analytics package 100 may track or import user actions associated with the user engaging with the image-based links 274. For example, the tracked user actions may include information regarding the total number of views (e.g., which may be broken down into the views for a given day, week, month or year), the total impressions, the unique impressions, the total click throughs, and/or the unique click throughs associated with the window 272 of image-based links 274, to name a few.

FIG. 16 depicts an example of a screenshot 280 of a calendar 282 on which the analytics package 100 of FIG. 4 may be employed, in accordance with aspects of the present disclosure. The analytics package 100 may track or import user actions associated with the user engaging with the calendar 282. For example, the tracked user actions may include information regarding the total number of views (e.g., which may be broken down into the views for a given day, week, month or year), the total impressions, and/or the total times the calendar 282 has been downloaded (e.g., added to the user's calendar), to name a few.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a client instance hosted by a cloud-based platform implemented at a data center comprising one or more processors and one or more associated memory devices, wherein the client instance is accessible via one or more remote client networks; and
an analytics package configured to be implemented on the client instance, wherein the analytics package is configured to integrate as a plug-in extension to a web service, wherein integrating the analytics package comprises adding the plug-in extension to an interface of the web service, wherein the system is configured to perform operations comprising:
receiving a user criteria, wherein the user criteria specifies conditions under which the analytics package will run on the client instance;
configuring the analytics package to run on the client instance based on the user criteria and the web service;
tracking a plurality of user actions performed on content accessible within a portal running on the client instance to generate action data corresponding to the plurality of tracked user actions;
receiving additional action data indicative of an additional plurality of user actions performed on the content as tracked by the web service until the action data and the additional action data reach a threshold value of entries, wherein integrating the analytics package allows the additional action data indicative of the additional plurality of user actions to be imported from the web service; and
generating an analytics report comprising the action data and the additional action data with respect to one or more tracked targeted content events indicative of one or more types of user interactions with the content.

2. The system of claim 1, wherein the operations comprise adding an authenticated Representational State Transfer (REST) application programming interface (API) to the action data, wherein the REST API facilitates distinguishing the action data from the additional action data.

3. The system of claim 1, wherein selection of the plug-in extension on the interface causes the analytics report to be generated.

4. The system of claim 1, wherein the action data comprise a time duration a user accesses the portal or one or more features of the portal, a number of times the portal or the one or more features of the portal were accessed, or device information indicative of a device used to access the portal, or any combination thereof.

5. The system of claim 4, wherein the device comprises a laptop, a mobile phone, a tablet, or a desktop, or any combination thereof.

6. The system of claim 1, wherein the content comprises an enterprise service page comprising selectable features enabling one or more employees of an enterprise to engage with an E-mail service, a banner notification, one or more campaign items, a selectable URL, a video, one or more images associated with a hyperlink, or an electronic calendar, or any combination thereof.

7. The system of claim 1, wherein the analytics package is associated with a content delivery package, a content automation package, or both.

8. The system of claim 1, wherein an identity of users who perform the plurality of user actions is anonymous with regard to the action data.

9. The system of claim 1, wherein tracking the plurality of user actions comprises storing the action data and the additional action data in one or more buffers to allow for storage of over 10,000 records.

10. A processor-implemented method for generating analytics information, the processor-implemented method comprising:
receiving a user criteria specifying a web service integratable with an analytics package on a client instance hosted by a platform, wherein the client instance is accessible via one or more remote client networks, wherein the analytics package is configured to be implemented on the client instance as a plug-in extension added to an interface of the web service based on the user criteria and the web service, wherein the analytics package is configured to track a plurality of user actions performed on content accessible within a portal running on the client instance to generate action data corresponding to the plurality of tracked user actions;
integrating the analytics package with the web service to allow additional action data indicative of an additional plurality of user actions performed on the content to be imported from the web service to the analytics package until the action data and the additional action data reach a threshold value of entries; and generating an analytics report comprising the action data and the additional action data with respect to one or more tracked targeted content events indicative of one or more types of user interactions with the content.

11. The processor-implemented method of claim 10, comprising adding an authenticated Representational State Transfer (REST) application programming interface (API) to the action data.

12. The processor-implemented method of claim 10, wherein selection of the plug-in extension on the interface causes the analytics report to be generated.

13. The processor-implemented method of claim 10, comprising tracking the plurality of user actions performed within the portal.

14. A system, comprising:
 a client instance hosted by a cloud-based platform implemented at a data center comprising one or more processors and one or more associated memory devices, wherein the client instance is accessible via one or more remote client networks; and
 an analytics package configured to be implemented on the client instance and configured to integrate as a plug-in extension to a web service, wherein integrating the analytics package with the web service comprises adding the plug-in extension indicative of the analytics package to an interface of the web service, wherein the system is configured to perform operations comprising:
  tracking a plurality of user actions performed on content accessible via a portal running on the client instance to generate action data corresponding to the plurality of tracked user actions;
  importing additional action data indicative of an additional plurality of user actions performed on the content as tracked by the web service to the analytics package, wherein the additional plurality of user actions corresponds to user interactions with respect to the content as tracked by the web service, and wherein the additional action data is imported until the action data and the additional action data reach a threshold value of entries, wherein integrating the analytics package allows the additional action data indicative of the additional plurality of user actions to be imported from the web service; and
  generating an analytics report comprising the action data and the additional action data with respect to one or more tracked targeted content events indicative of one or more types of user interactions with the content.

15. The system of claim 14, wherein the analytics package is associated with a content delivery package, a content automation package, or both.

16. The system of claim 14, wherein the operations comprise storing the action data, the additional action data, or both, in one or more buffers, as respective entries.

17. The system of claim 16, wherein the additional plurality of user actions are imported into another buffer in response to the respective entries in the one or more buffers exceeding the threshold value of entries.

18. The system of claim 14, wherein the operations comprise adding an authenticated Representational State Transfer (REST) application programming interface (API) to the action data to distinguish the action data from the additional action data.

\* \* \* \* \*